(12) United States Patent
Gurewitz et al.

(10) Patent No.: US 9,042,268 B2
(45) Date of Patent: May 26, 2015

(54) OVER-THE-AIR PROGRAMMING OF MAC ADDRESS TO WIFI IC IN PRODUCTION LINE

(71) Applicant: QUALCOMM Incorporated, San Diego, CA (US)

(72) Inventors: Oran Gurewitz, Sunnyvale, CA (US); Peter Hendrik Van Horn, Jr., San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 138 days.

(21) Appl. No.: 13/662,394

(22) Filed: Oct. 26, 2012

(65) Prior Publication Data

US 2014/0119232 A1 May 1, 2014

(51) Int. Cl.
*H04L 12/28* (2006.01)
*H04W 84/18* (2009.01)

(52) U.S. Cl.
CPC ..................... *H04W 84/18* (2013.01)

(58) Field of Classification Search
CPC .... H04W 76/02; H04W 76/021; H04W 84/18
USPC .................................. 370/254, 338
See application file for complete search history.

(56) References Cited

U.S. PATENT DOCUMENTS

| 6,157,651 | A | * | 12/2000 | Meares et al. | 370/403 |
|---|---|---|---|---|---|
| 8,194,586 | B2 | | 6/2012 | Mizukoshi | |
| 2003/0165230 | A1 | * | 9/2003 | Reuss | 379/265.02 |
| 2007/0140191 | A1 | * | 6/2007 | Kojima | 370/338 |
| 2007/0211653 | A1 | * | 9/2007 | Mizukoshi | 370/312 |
| 2011/0230139 | A1 | | 9/2011 | Nakahara | |
| 2011/0310815 | A1 | | 12/2011 | Kim et al. | |
| 2012/0044862 | A1 | | 2/2012 | Chen et al. | |
| 2012/0166655 | A1 | | 6/2012 | Maddali et al. | |

\* cited by examiner

*Primary Examiner* — Kan Yuen
(74) *Attorney, Agent, or Firm* — DeLizio Law, PLLC

(57) ABSTRACT

Systems, methods and computer-readable media provide a MAC (Media Access Control) address to a device, for example, while the device is on a production line. In response to receiving a signal to initiate a MAC acquisition process, the device connects to a wireless network. A MAC address server within wireless range of the wireless device detects the connection to the wireless. The MAC address server determines an available MAC address and communicates the available MAC address to the device over the wireless network. The device associates the available MAC address as a source MAC address for the device in future communications sessions.

25 Claims, 5 Drawing Sheets

OVER-THE-AIR PROGRAMMING OF MAC ADDRESS TO WIFI IC IN PRODUCTION LINE

BACKGROUND

Embodiments of the inventive subject matter generally relate to the field of wireless communications devices, and, more particularly, to over the air programming of MAC addresses for wireless communications devices in a production line.

As the cost of providing wireless communications capability comes down, more and more devices integrate wireless communications functionality. Wireless communications provide the ability for devices to communicate with one another over a wireless communications network. In order to ensure that wireless data is communicated to the proper target device, each device communicating on a network must have a unique physical layer address, referred to as a MAC (Media Access Control) address. MAC addresses are typically programmed into a wireless device during a production line process for a host device that includes the wireless device. In typical production environments, the host device provides a fixture or socket for wired communications with a configuration system. The host device receives the MAC address for the wireless device through the socket or fixture, and accesses the wireless device through a conducted bus interface to instruct the wireless device to program the MAC address into a persistent memory accessible by the wireless device. Thus the logic for receiving a MAC address and programming the MAC address generally resides on the host device. The socket or fixture adds to the cost of the host device, and further suffers from the disadvantage that bent or broken pins on the socket or fixture can make it impossible to correctly program the MAC address for the wireless device integrated with the host device. Further, host devices can have many different hardware configurations and operating systems, and as a result, the code to obtain and program a MAC address may need to be adapted to many different environments. Thus current methods of programming a MAC address through a conducted interface do not scale well.

SUMMARY

Various embodiments are disclosed for providing a MAC address to a device, for example while the device is on a production line. In response to receiving a signal to initiate a MAC acquisition process, the device connects to a wireless network. A MAC address server within wireless range of the device detects the connection to the wireless network. The MAC address server determines an available MAC address and communicates the available MAC address to the device over the wireless network. The device receives the available MAC address and associates the MAC address as a source MAC address of the device in future communications sessions.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
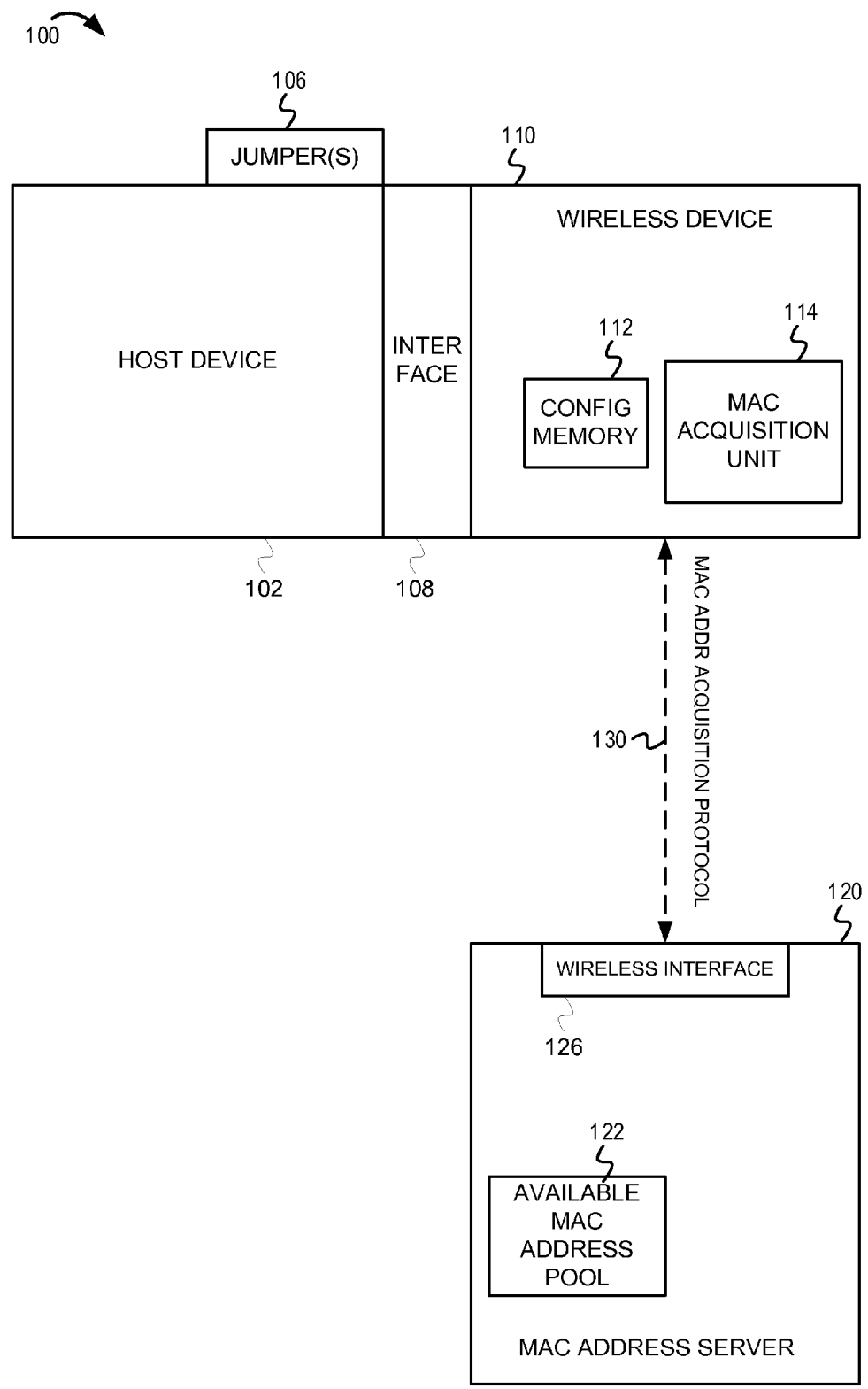
FIG. 1 depicts an example system for programming a MAC address for a wireless device according to embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Additionally, "configured to" can include generic structure (e.g., generic circuitry) that is manipulated by software and/or firmware (e.g., an FPGA or a general-purpose processor executing software) to operate in manner that is capable of performing the task(s) at issue.

The terms "first", "second" etc. are used as labels for nouns that they precede, and do not imply any type of ordering (e.g., spatial, temporal, logical, etc.). For example, in a P1905.1 compliant network, the terms "first" and "second" messages can be used to refer to any two messages. In other words, the "first" and "second" messages are not limited to logical occurrences 0 and 1.

The term "based on" is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The description that follows includes exemplary systems, methods, techniques, instruction sequences and computer program products that embody techniques of the present inventive subject matter. However, it is understood that the described embodiments may be practiced without these specific details. For instance, although examples refer to WLAN devices, other wireless devices may be used. For example, Bluetooth® wireless devices may incorporate the disclosed systems and methods. In other instances, well-known instruction instances, protocols, structures and techniques have not been shown in detail in order not to obfuscate the description.

Generally speaking, the inventive subject matter includes systems, methods and computer-readable media for providing a permanent MAC address to a wireless device while the wireless device is on a production line. The wireless device is coupled to a host device during a production line process. In addition, a jumper may be set on the host device, where the jumper setting is used to indicate that the wireless device coupled to the host device requires allocation of a permanent MAC address. Power is applied to the host device on the production line, and the host device may read the jumper setting. In response to the jumper setting, the host device issues a signal to the wireless device. The wireless device connects to an ad hoc network using a temporary MAC address. A MAC address server within wireless range of the wireless device detects the ad hoc network and establishes a connection to the ad hoc network. The MAC address server obtains an available MAC address from a pool of available MAC addresses and communicates the available MAC address to the wireless device over the ad hoc network. The wireless device stores the available MAC address in a persistent memory on the wireless device and uses the available MAC address as the permanent MAC address of the wireless device in future communications sessions. The jumper indicating a MAC address is required by the wireless device may then be removed.

FIG. 1 depicts an example system 100 for programming a MAC address for a wireless device according to embodiments. In some embodiments, system 100 includes a MAC address server 120 and a host device 102, wherein the host device 102 is coupled to a wireless device 110 through an interface 108. Host device 102 may be a circuit board having one or more processors, memory and program logic for controlling a host apparatus such as a computer, network appliance, mobile phone, MP3 player, home appliance etc. The embodiments are not limited to any particular host apparatus. In some embodiments, host device 102 may optionally include one or more jumpers 106 that may be used to provide basic configuration options for host device 102.

Wireless device 110 includes program logic and protocol stacks to implement one or more wireless communications protocols such as the IEEE 802.11 family of wireless protocols (also referred to as "Wi-Fi®" protocols). Host device 102 uses wireless device 110 to communicate with other wireless devices in a wireless network. Wireless device 110 may be an integrated circuit (IC), system-in-package or other electronic device having one or more processors, memory and a wireless network interface for communicating with other wireless devices. Wireless device 110 includes configuration memory 112 that stores configuration parameters used by wireless device 110. Such parameters may include the MAC address for the wireless device and radio calibration data used by a wireless transmitter/receiver (not shown) on wireless device 110. In some embodiments, configuration memory 112 may be OTP (one-time programmable) memory.

Wireless device 110 may include a MAC acquisition unit 114. MAC acquisition unit comprises logic configured to acquire a MAC address from a MAC server 120. In some embodiments, MAC acquisition unit implements a protocol (e.g., MAC acquisition protocol 130) that is used during a communications session with a MAC address server 120 that may be initiated while host device 102 and wireless device 110 are on a production line. MAC acquisition unit 114 may comprise logic stored on a persistent memory of wireless device 110 such as a ROM or flash memory of wireless device 110. Typically, MAC acquisition unit 114 may be executed a single time on a production line, and after acquiring a MAC address, not executed again.

Wireless device 110 may provide a plurality of pins that provide an interface 108 to host device 102. Various signals may be passed between host device 102 and wireless device 110 through interface 108. The pins of interface 108 may be soldered to the circuit board for host device 102, or may be placed in a socket or fixture of host device 102.

MAC address server 120 is a computer configured to provide available MAC addresses to wireless devices 110. MAC address server 120 may be any type of computer, including a server computer, personal computer, laptop computer, tablet computer, or any other suitably configured processing device. MAC address server 120 includes a wireless interface 126 for communicating with wireless device 110. MAC address server 120 maintains an available MAC address pool 122. In some implementations, available MAC address pool 120 is a data structure that contains available MAC addresses. A MAC address is considered "available" if it has not been previously allocated to a wireless device 110 or other device. Available MAC address pool 122 may be implemented in any of a number of ways. For example, available MAC address pool 122 may be an array of available MAC address. Alternatively, available MAC address pool 122 may be a range indicating a beginning and ending MAC address of a range of available MAC addresses. Once allocated, a MAC address is removed from the available MAC address pool 122.

In some embodiments, MAC address server 120 is positioned on or near a production line where host device 102 is coupled to wireless device 110. At a predetermined point in the production line process, power is applied to host device 102. Host device 102 may signal wireless device 110 through interface 108 to initiate a MAC address acquisition. In response to receiving the signal, wireless device 110 communicates with MAC address server 120 to obtain an available MAC address from available MAC address pool 122. Wireless device 110 then programs itself to use the available MAC address as a permanent MAC address in future communications sessions (e.g., within an end-user wireless network). Further details on the operation of various embodiments of system 100 are provided below with reference to FIGS. 2-4.

Figure 2:
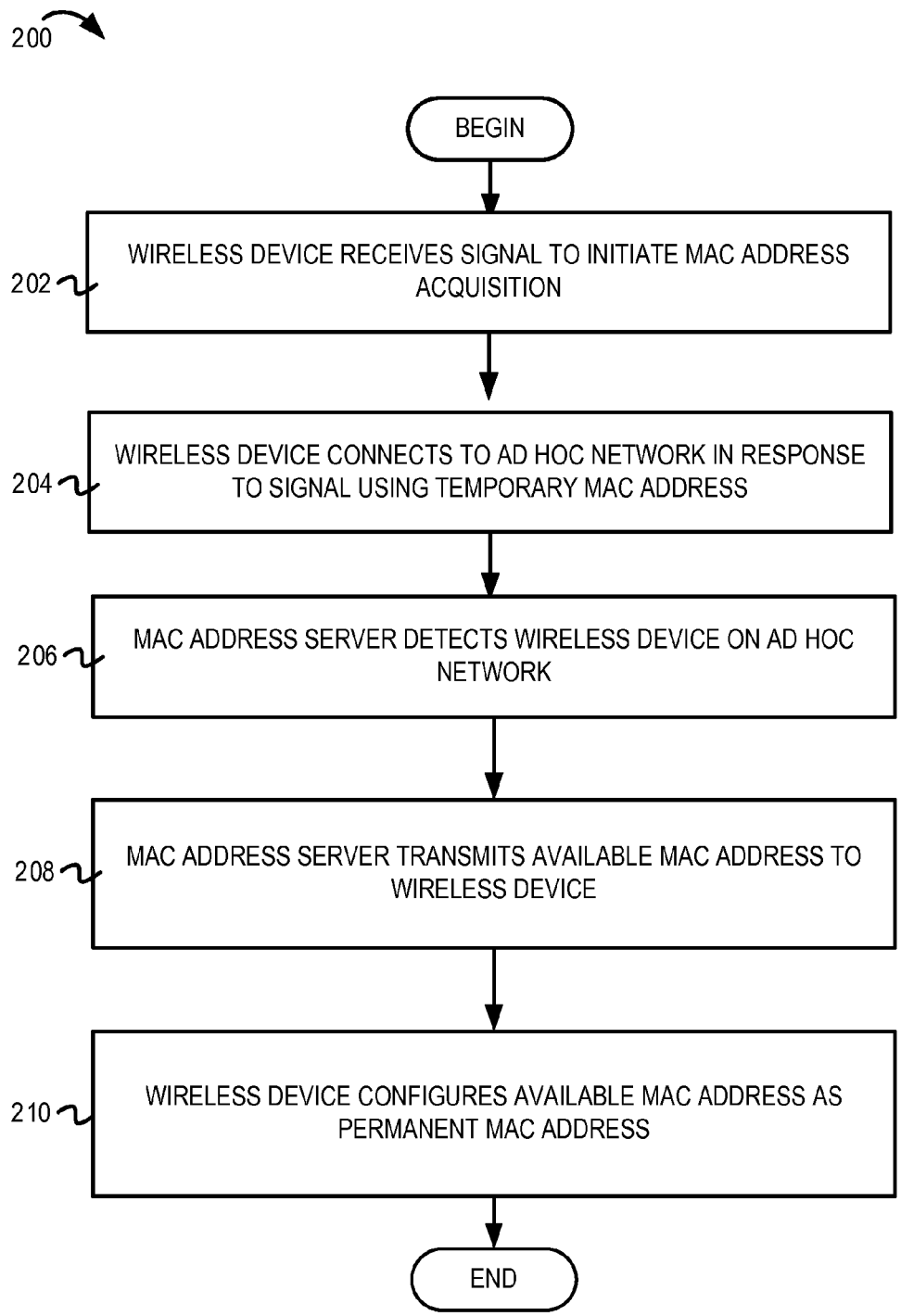
FIG. 2 is a flowchart illustrating a method for programming a MAC address for a wireless device according to embodiments.

FIG. 2 is a flowchart illustrating a method 200 for programming a MAC address for a wireless device according to embodiments. Method 200 begins at block 202 with the wireless device receiving a signal to initiate a MAC address acquisition process. In some embodiments, the wireless device receives the signal from a host device coupled to the wireless device. The signal may comprise setting a pin of interface 108 to a predetermined value. Alternatively, the signal may comprise setting a register on the wireless device to a predetermined value indicating that the MAC acquisition process is to be initiated. Host device 102 may be configured to provide the signal to wireless device 110 in response to detecting a jumper setting of jumper 106 when power is applied to host device 102. The jumper may be set as part of a production line process for host device 102. In one embodiment, to receive the signal, wireless device 110 may check for the presence of the signal in response to a power-up of the wireless device 110 (which may accompany the power up of the host device 102 coupled to wireless device 110).

At block 204, in response to receiving the signal, wireless device 110 begins executing a MAC address acquisition process by, in one embodiment, creating using a temporary MAC address a wireless network (e.g., an ad hoc wireless network) with at least the MAC address server 120. Embodiments for creating the ad hoc wireless network may include the wireless device 110 accepting a network request from the MAC address server 120 or the wireless device 110 sending a network request to the MAC address server 120 which is accepted.

Alternatively, the wireless device 110 may connect to an existing ad hoc wireless network, the ad hoc wireless network including the MAC address server 120. The temporary MAC address used by the wireless device may be determined in various ways. In some embodiments, the temporary MAC address may be a predetermined MAC address stored in memory of the wireless device. In alternative embodiments, the temporary MAC address may be determined by the wireless device. For example, the wireless device may utilize, at least in part, a die identifier, lot number or serial number stored on the wireless device to form a temporary MAC address.

In addition to connecting to an ad hoc network, the wireless device 110 may initiate a MAC address acquisition protocol 130. The MAC address acquisition protocol 130 may be an application layer protocol that uses a transport layer protocol. In some embodiments, the transport layer protocol is UDP (User Datagram Protocol). Alternative embodiments may use other transport layer protocols. As a first step in the MAC address acquisition protocol 130, the wireless device 110 may announce its presence on the ad hoc network. In some embodiments, the wireless device may transmit a presence announcement message on the ad hoc network (e.g., a "hello" message). In some embodiments, the presence announcement message includes a die identifier for the wireless device 110. The presence announcement message may be periodically repeated until a response is received. For example, the presence announcement message may be repeated every 50 milliseconds.

At block 206, a MAC address server 120 detects the presence of the wireless device 110 on the ad hoc network. In addition, the MAC address server 120 may receive the presence announcement message transmitted by the wireless device 110. In response, at block 208 the MAC address server selects an available MAC address from the available MAC address pool 122 and transmits the available MAC address to the wireless device 110. In some embodiments, the MAC address server 120 transmits the available MAC address in a response message to the presence announcement message received from the wireless device 110. The response message may be periodically retransmitted until acknowledged by the wireless device 110. The response message may include a sequence number, which may be used by the wireless device 110 to acknowledge receipt of the response message. The wireless device 110 may acknowledge receipt of the available MAC address in an acknowledgement message sent to the MAC address server 120. The wireless device 110 may include the sequence number received in the response message containing the available MAC address.

At block 210, the wireless device 110 receives the available MAC address and configures itself to use the available MAC address as a permanent MAC address for the wireless device 110. In some embodiments, the wireless device 110 writes the available MAC address to a persistent memory on the wireless device 110 (e.g., configuration memory 112). The persistent memory may be an OTP memory. In one embodiment, after the wireless device 110 has completed the MAC address acquisition process, the jumper on host device 102 may be removed.

In addition but not illustrated in FIG. 2, the response message containing the available MAC address may contain other data to be programmed into the wireless device. For example, radio calibration data may be included along with the available MAC address.

In addition, the MAC acquisition protocol may include a verification message sent by the wireless device to the MAC address server to indicate that the available MAC address has been successfully programmed into the wireless device.

Figure 3:
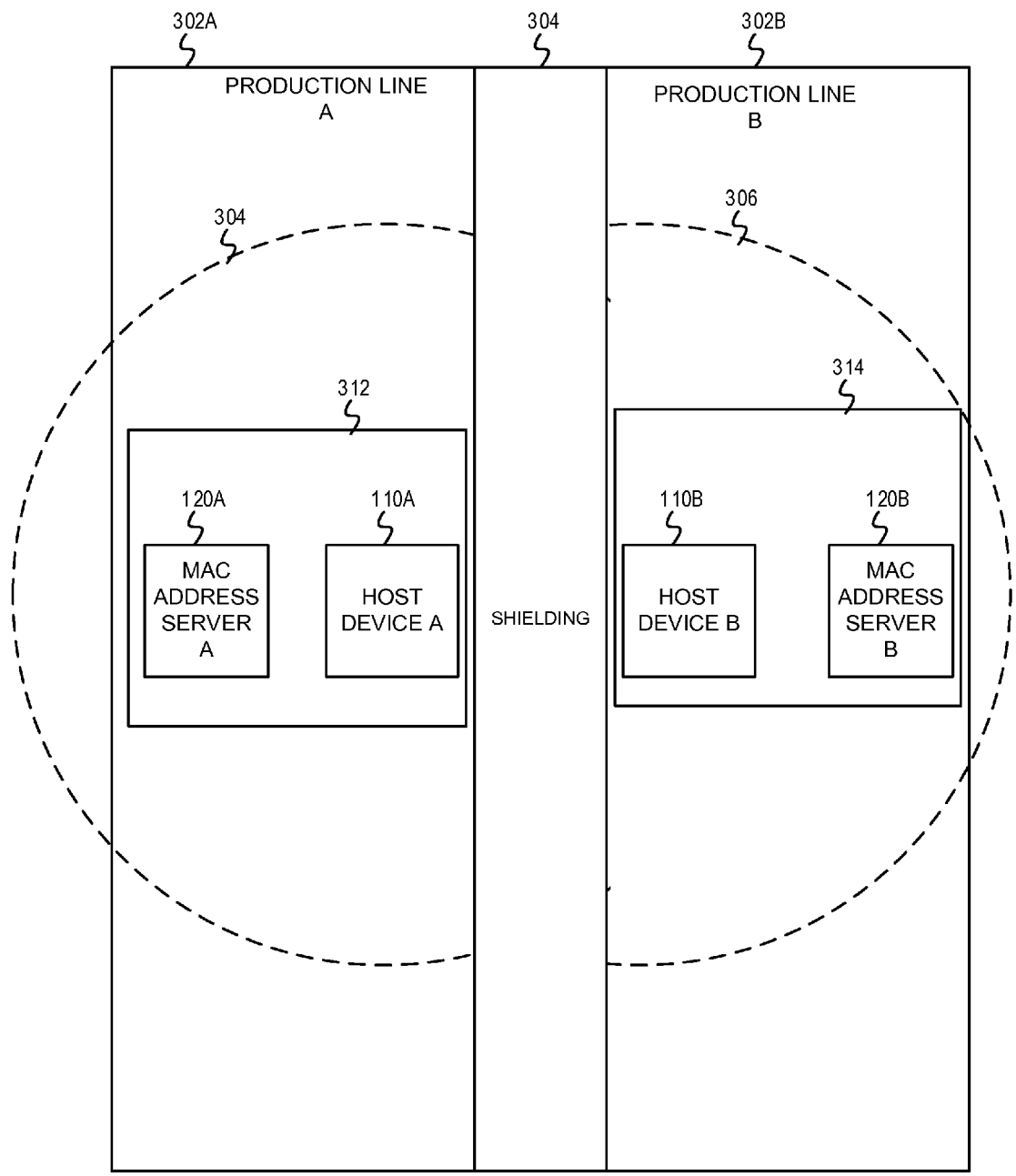
FIG. 3 illustrates an example production environment in which embodiments of the invention may be utilized.

FIG. 3 illustrates an example production environment 300 in which embodiments of the invention may be utilized. As noted above, method 200 may be used in a production line for a host device. FIG. 3 illustrates an example production environment 300 having multiple production lines, including production lines 302A and 302B. In some embodiments, each production line has a MAC address server associated with the production line. In the example shown in FIG. 3, MAC address server 120A is associated with production line 302A and MAC address server 120B is associated with production line 302B. MAC address servers 120A and 120B may share a pool of available MAC addresses or they each may maintain their own separate pools of available MAC addresses. Host devices 110A and 110B may be present on the production line. For the purposes of the example, assume wireless devices have been coupled to each of host devices 110A and 110B, and the wireless devices are now ready to receive an available MAC address. It is possible that each of the wireless devices may connect to an ad hoc network associated with each production line. The range of the ad hoc network created on production line 302A is indicated by dashed line 304, and the range of the ad hoc network created on production line 302B is indicated by dashed line 306. It is possible that the ranges of the ad hoc networks created on production lines 302A and 302B may overlap, creating the potential for wireless devices to communicate with the wrong MAC address server. In some embodiments, shielding is used to prevent a wireless device from communicating with the wrong MAC address server. In some embodiments, a shielding enclosure 312 (314) may enclose a MAC address server 120A (120B) and host device 110A (110B) until the wireless device coupled to the host device 110A (110B) obtains an available MAC address. In alternative embodiments, a shielding wall 304 may exist between production lines 302A and 302B to prevent signals from extraneous MAC address servers from interfering with a MAC address acquisition between a wireless device and a MAC address server.

Figure 4:
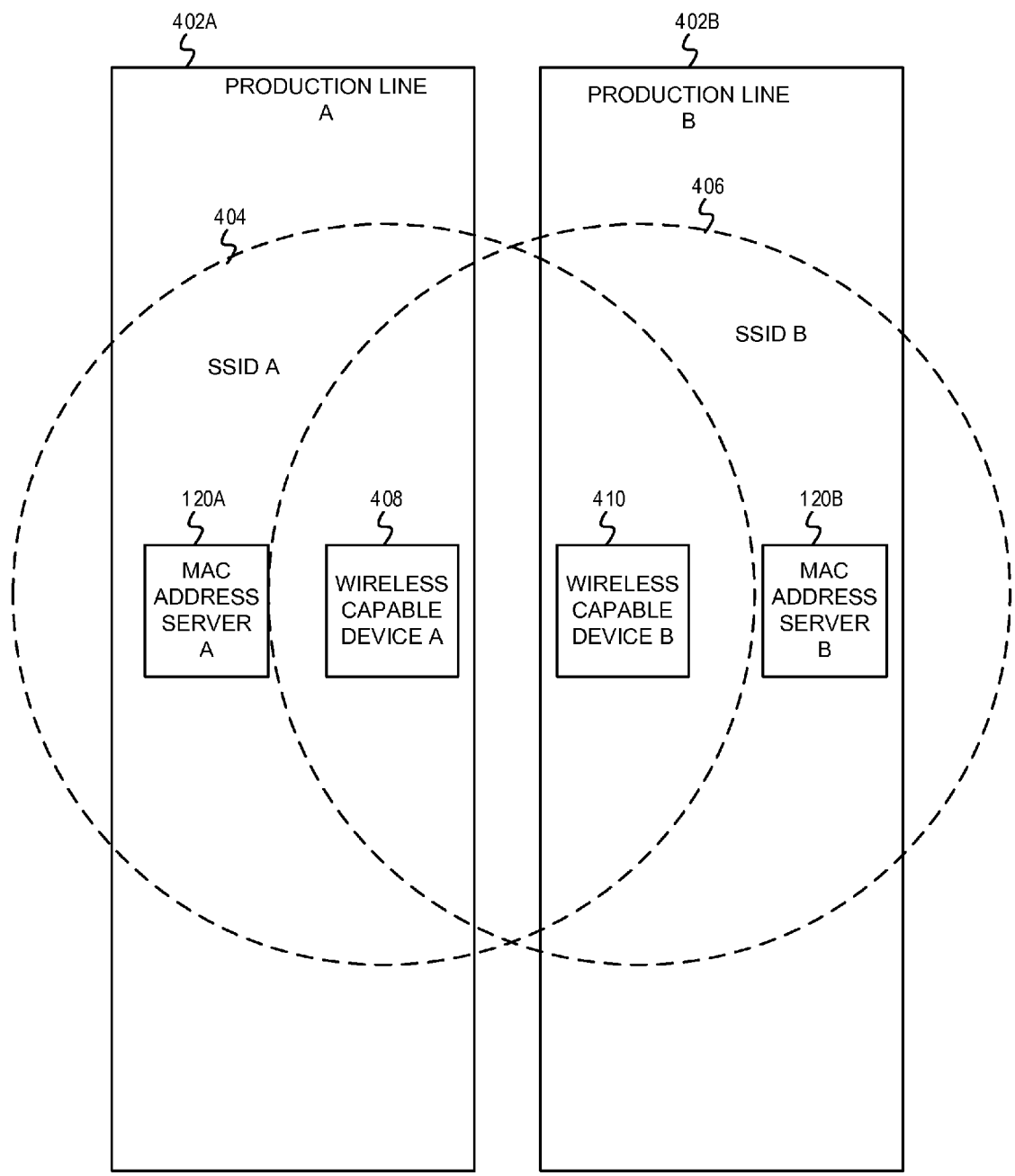
FIG. 4 illustrates an alternative example production environment according to embodiments.

FIG. 4 illustrates an alternative example production environment 400 according to embodiments. Like the example presented in FIG. 3, production environment 400 may include multiple production lines, including production lines 402A and 402B. The ranges of ad hoc networks created on production lines 402A and 402B are indicated by dashed lines 404 and 406 respectively. In the example illustrated in FIG. 4, each production line is configured to use a separate SSID (Service Set Identifier). In the example illustrated in FIG. 4, MAC address server 120A on production line 402A is configured to use SSID A to connect with wireless capable device 408 and MAC address server 102B on production line 402B is configured to use SSID B to connect with wireless capable device 410. A wireless device (e.g., 408, 410) coupled to a host device (not pictured) on a production line may determine the SSID to use based on a jumper configuration on the host device coupled to the wireless device. For example, a host device may provide one or more signals through interface 108 (FIG. 1) indicating the SSID to be used based on the jumper settings.

Although two production lines are illustrated in the examples shown in FIGS. 3 and 4, those of skill in the art having the benefit of the disclosure will appreciate that more than two production lines may be used and the concepts illustrated in FIGS. 3 and 4 may be extended to such environments.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the embodiments may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 5:
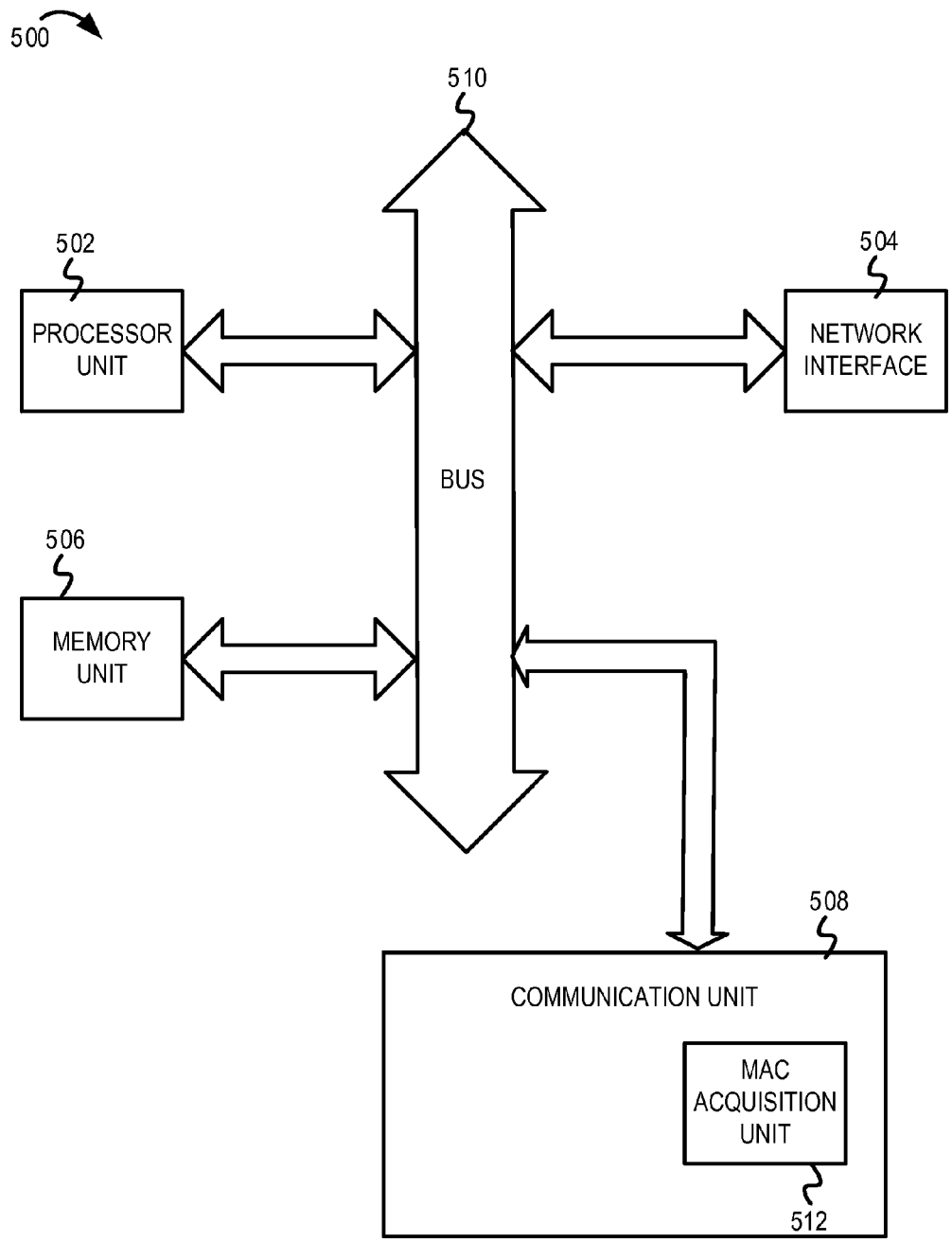
FIG. 5 is an example block diagram of one embodiment of a wireless device including a mechanism for programming a MAC address for the wireless device.

FIG. 5 is an example block diagram of one embodiment of a wireless device 500 including a mechanism for acquiring a MAC address. The wireless device 500 includes a processor unit 502 (possibly including multiple processors, multiple cores, multiple nodes, and/or implementing multi-threading, etc.). The wireless device 500 includes a memory unit 506. The memory unit 506 may be system memory (e.g., one or more of cache, OTP, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 500 also includes a bus 510 (e.g., PCI, ISA, PCI-Express, HyperTransport®, InfiniBand®, NuBus, AHB, AXI, etc.), and network interface 504 that includes a wireless network interface (e.g., a WLAN interface, a Bluetooth® interface, a WiMAX interface, a ZigBee® interface, a Wireless USB interface, etc. In some implementations, the electronic device 500 may support multiple network interfaces—each of which is configured to couple the wireless device 500 to a different communication network.

The wireless device 500 also includes a communication unit 508. The communication unit 508 comprises a MAC address acquisition unit 512. As described above in FIGS. 1-4, the communication unit 508 implements functionality to implement a wireless protocol stack, to communicate over a wireless network. Any one of these functionalities may be partially (or entirely) implemented in hardware and/or on the processor unit 502. For example, the functionality may be implemented with an application specific integrated circuit, in logic implemented in the processor unit 502, in a co-processor on a peripheral device or card, etc. Further, realizations may include fewer or additional components not illustrated in FIG. 5 (e.g., additional network interfaces, encryption units, authentication units, etc.). The processor unit 502, the memory unit 506, and the network interfaces 504 are coupled to the bus 510. Although illustrated as being coupled to the bus 510, the memory unit 506 may be coupled to the processor unit 502.

While the embodiments are described with reference to various implementations and exploitations, it will be understood that these embodiments are illustrative and that the scope of the inventive subject matter is not limited to them. In general, techniques for acquiring a MAC address as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   receiving, by a device, a signal to initiate media access control (MAC) address acquisition, wherein receiving the signal to initiate the MAC address acquisition comprises one of receiving the signal via a pin on an interface between the device and a host device, and determining a register on the device has been set to a predetermined value by the host device;
   determining a unique identifier for the device;
   creating, by the device, a temporary MAC address for the device based, at least in part, on the unique identifier;
   connecting the device to a wireless network using the temporary MAC address;
   receiving by the device an available MAC address, wherein the available MAC address is from a MAC address server connected to the wireless network; and
   configuring, by the device, the available MAC address as a permanent MAC address for the device.

2. The method of claim 1, further comprising:
in response to connecting the device to the wireless network, sending a presence announcement message for the device,
wherein receiving by the device the available MAC address comprises, in response to sending the presence announcement message, receiving from the MAC address server a response message including the available MAC address.

3. The method of claim 1, wherein the temporary MAC address includes at least a portion of the unique identifier.

4. The method of claim 1, wherein the unique identifier comprises an identifier stored locally on one of the device and the host device.

5. The method of claim 1, wherein the unique identifier comprises at least one member of a group consisting of: a die identifier, a lot identifier, and a serial number.

6. The method of claim 1, wherein connecting the device to the wireless network comprises determining a service set identifier (SSID) for the wireless network.

7. The method of claim 1, wherein the wireless network comprises an ad hoc wireless network.

8. The method of claim 1, wherein the device is a wireless device.

9. A device, comprising:
a transceiver;
a processor communicably coupled to the transceiver; and
a non-transitory machine-readable medium communicably coupled to the processor and having stored thereon machine executable instructions, which when executed, cause the processor to:
receive a signal to initiate media access control (MAC) address acquisition, wherein receiving the signal to initiate the MAC address acquisition comprises one of receiving the signal via a in on an interface between the device and a host device, and determining a register on the device has been set to a predetermined value by the host device,
determine a unique identifier for the device,
create a temporary MAC address for the device based, at least in part, on the unique identifier,
cause the transceiver to connect the device to a media access control (MAC) address server over a wireless network using the temporary MAC address,
receive, from the MAC address server, an available MAC address, and
configure the available MAC address as a permanent MAC address for the device.

10. The device of claim 9, wherein the transceiver is further to transmit a presence announcement message to the MAC address server, wherein receiving the available MAC address comprises receiving a response message from the MAC address server, the response message including the available MAC address.

11. The device of claim 9, wherein the non-transitory machine-readable medium is further to store the unique identifier.

12. The device of claim 11, wherein the unique identifier comprises at least one member of a group consisting of: a die identifier, a lot identifier, and a serial number.

13. The device of claim 9, further comprising a coupler to couple the device to the host device, wherein the device receives the signal to initiate MAC address acquisition from the host device.

14. The device of claim 9, wherein:
the non-transitory machine-readable medium further includes instructions to cause the processor to determine a service set identifier (SSID) for the wireless network, and
the transceiver to use the SSID in connecting the device to the MAC address server.

15. A media access control (MAC) address server, comprising:
a memory to store an available MAC address; and
a wireless interface coupled to the memory, the wireless interface to:
connect the MAC address server to a wireless network,
detect a connection of a wireless device to the wireless network, wherein the wireless device connects to the wireless network in response to receiving a signal to initiate media access control (MAC) address acquisition, wherein receiving the signal to initiate the MAC address acquisition comprises one of receiving the signal via a in on an interface between the wireless device and a host device, and determining a register on the wireless device has been set to a predetermined value by the host device,
in response to detecting the connection of the wireless device, transmit the available MAC address to the wireless device, wherein the available MAC address is to be used by the wireless device as a permanent MAC address associated with the wireless device, and
receive, from the wireless device, a verification message indicating that the available MAC address has been successfully configured as the permanent MAC address for the wireless device.

16. The MAC address server of claim 15, wherein the wireless interface:
in response to detecting the connection of the wireless device, to receive a presence announcement message for the wireless device, and
in response to receiving the presence announcement message, to use a response message to transmit the available MAC address to the wireless device.

17. The MAC address server of claim 15, wherein the wireless interface to use an ad hoc wireless protocol to connect the MAC address server to the wireless network.

18. A non-transitory machine-readable medium having stored thereon machine executable instructions, which when executed by one or more processors cause the one or more processors to perform operations that comprise:
detecting a connection of a wireless device to a wireless network, wherein the wireless device connects to the wireless network in response to receiving a signal to initiate media access control (MAC) address acquisition, wherein receiving the signal to initiate the MAC address acquisition comprises one of receiving the signal via a pin on an interface between the wireless device and a host device, and determining a register on the wireless device has been set to a predetermined value by the host device; and
in response to detecting the connection of the wireless device to the wireless network:
determining an available media access control (MAC) address,
transmitting the available MAC address to the wireless device, wherein the available MAC address is to be used by the wireless device as a permanent MAC address associated with the wireless device, and
receiving, from the wireless device, a verification message indicating that the available MAC address has been successfully configured as the permanent MAC address for the wireless device.

19. The non-transitory machine-readable medium of claim 18, wherein detecting the connection of the wireless device to the wireless network includes receiving a presence announcement message from the wireless device and wherein transmitting the available MAC address includes transmitting the available MAC address in a response message.

20. The non-transitory machine-readable medium of claim 18, wherein determining the available MAC address includes determining the available MAC address from a pool of available MAC addresses.

21. The non-transitory machine-readable medium of claim 18, wherein detecting the connection of the wireless device to the wireless network includes detecting the connection of the wireless device to an ad-hoc wireless network.

22. A non-transitory machine-readable medium having stored thereon machine executable instructions, which when executed by one or more processors of a device cause the one or more processors to perform operations that comprise:

receiving a signal to initiate media access control (MAC) address acquisition, wherein receiving the signal to initiate the MAC address acquisition comprises one of receiving the signal via a in on an interface between the device and a host device, and determining a register on the device has been set to a predetermined value by the host device;

determining a unique identifier for the device;

creating a temporary MAC address for the device based, at least in part, on the unique identifier, wherein the temporary MAC address includes at least a portion of the unique identifier;

connecting the device to a wireless network using the temporary MAC address;

receiving an available MAC address, wherein the available MAC address is from a MAC address server connected to the wireless network; and configuring the available MAC address as a permanent MAC address for the device.

23. The non-transitory machine-readable medium of claim 22, wherein the operations further comprise, in response to connecting to the wireless network, sending a presence announcement message.

24. The non-transitory machine-readable medium of claim 22, wherein the operations further comprise determining a service set identifier (SSID) for the wireless network.

25. The non-transitory machine-readable medium of claim 24, wherein determining the SSID includes determining the SSID based on a jumper setting.

* * * * *